United States Patent
Nozawa et al.

(10) Patent No.: US 11,302,123 B2
(45) Date of Patent: Apr. 12, 2022

(54) INFORMATION RECORDING DEVICE, INFORMATION RECORDING METHOD, AND PROGRAM FOR RECORDING INFORMATION

(71) Applicant: PIONEER CORPORATION, Tokyo (JP)

(72) Inventors: Morimichi Nozawa, Tokyo (JP); Takayoshi Kobayashi, Tokyo (JP); Masao Nakane, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 16/961,220

(22) PCT Filed: Jan. 8, 2019

(86) PCT No.: PCT/JP2019/000191
§ 371 (c)(1),
(2) Date: Oct. 15, 2020

(87) PCT Pub. No.: WO2019/138994
PCT Pub. Date: Jul. 18, 2019

(65) Prior Publication Data
US 2021/0056784 A1 Feb. 25, 2021

(30) Foreign Application Priority Data
Jan. 11, 2018 (JP) .............................. JP2018-002644

(51) Int. Cl.
*G07C 5/08* (2006.01)
*B60K 35/00* (2006.01)
(52) U.S. Cl.
CPC ............ *G07C 5/0825* (2013.01); *B60K 35/00* (2013.01); *G07C 5/0841* (2013.01);
(Continued)

(58) Field of Classification Search
CPC .... G07C 5/0825; G07C 5/0841; B60K 35/00; B60K 2370/1529; B60K 2370/167; B60K 2370/175; B60K 2370/172
See application file for complete search history.

(56) References Cited

U.S. PATENT DOCUMENTS

| | | | |
|---|---|---|---|
| 11,054,827 B2 * | 7/2021 | Gdalyahu | G01C 21/3644 |
| 2002/0035422 A1 * | 3/2002 | Sasaki | G07C 5/085 |
| | | | 701/32.2 |

(Continued)

FOREIGN PATENT DOCUMENTS

| | | | |
|---|---|---|---|
| GB | 2523359 A | | 2/2014 |
| JP | 2003263695 A | * | 9/2003 |

(Continued)

OTHER PUBLICATIONS

International Search Report for JP App. No PCT/JP2019/000191 dated Feb. 5, 2019. English translation provided; 4 pages.

*Primary Examiner* — Chico A Foxx
(74) *Attorney, Agent, or Firm* — Procopio, Cory, Hargreaves & Savitch LLP (57) ABSTRACT

Outside image information corresponding to an outside image of the outside of a moving body photographed from the moving body is acquired, autonomous driving information indicating the state of autonomous driving control of the moving body is acquired, based on the outside image information and the autonomous driving information, display information for simultaneously displaying at least a part of the outside image and the autonomous driving state image indicating the state of the autonomous driving control of the moving body at the time of photographing the outside image is acquired, and the display information is recorded in a recording medium.

15 Claims, 5 Drawing Sheets

(52) U.S. Cl.
CPC ............................. *B60K 2370/155* (2019.05);
*B60K 2370/1529* (2019.05); *B60K 2370/167*
(2019.05); *B60K 2370/172* (2019.05); *B60K
2370/175* (2019.05)

(56) References Cited

U.S. PATENT DOCUMENTS

| | | | | |
|---|---|---|---|---|
| 2007/0067079 | A1* | 3/2007 | Kosugi | G07C 5/085 |
| | | | | 701/32.4 |
| 2010/0256858 | A1* | 10/2010 | Yago | G07C 5/0891 |
| | | | | 701/29.1 |
| 2011/0010089 | A1* | 1/2011 | Sambongi | G01C 21/165 |
| | | | | 701/408 |
| 2013/0278772 | A1* | 10/2013 | Yun | H04N 7/18 |
| | | | | 348/148 |
| 2014/0375446 | A1* | 12/2014 | Wanami | G08G 1/205 |
| | | | | 340/436 |
| 2017/0021765 | A1 | 1/2017 | Mori et al. | |
| 2017/0151910 | A1* | 6/2017 | Sato | B60R 1/00 |
| 2017/0294120 | A1 | 10/2017 | Ootsuji | |
| 2018/0065552 | A1 | 3/2018 | Mori et al. | |
| 2018/0218758 | A1 | 8/2018 | Maeda et al. | |
| 2018/0272934 | A1 | 9/2018 | Mori et al. | |
| 2019/0068925 | A1* | 2/2019 | Imomoto | G06K 9/00845 |
| 2019/0225175 | A1* | 7/2019 | Marcial-Simon | ............................ |
| | | | | B60R 21/0136 |
| 2019/0287319 | A1* | 9/2019 | Golov | G06F 11/0796 |
| 2019/0302766 | A1* | 10/2019 | Mondello | G06N 3/02 |
| 2020/0020180 | A1* | 1/2020 | Yao | G07C 5/0825 |

FOREIGN PATENT DOCUMENTS

| | | |
|---|---|---|
| JP | 2013206417 A | 10/2013 |
| JP | 2015182624 A | 10/2015 |
| JP | 2017206417 A | 2/2017 |
| JP | 2017097709 A | 6/2017 |
| JP | 2018124823 A | 8/2018 |
| JP | 2018156537 A | 10/2018 |
| WO | 2016080070 A1 | 5/2016 |

* cited by examiner

INFORMATION RECORDING DEVICE, INFORMATION RECORDING METHOD, AND PROGRAM FOR RECORDING INFORMATION

CROSS-REFERENCE TO RELATED APPLICATIONS

This application is a U.S. National Stage entry of PCT Application No. PCT/JP2019/000191, filed on Jan. 8, 2019, which claims priority to JP Application No. 2018-002644, filed Jan. 11, 2018. The contents of the foregoing are incorporated by reference.

TECHNICAL FIELD

The present application belongs to a technical field of an information recording device that records information indicating a situation where a moving body capable of autonomous driving is placed in a recording medium, for example, an image obtained by photographing the outside of the moving body.

BACKGROUND ART

In recent years, so-called driving recorders for photographing and recording for example the front of a moving vehicle are generalized for the purpose of later inspecting the situation when an accident or the like occurs while the vehicle is moving, for example.

As a prior art related to the driving recorder that photographs an image used for the inspection, for example, there is a prior art described in Patent Literature 1 described below. In this prior art, when the acceleration of a vehicle exceeds a threshold for determining whether an accident has occurred, on an image photographed for a predetermined time period before an accident occurs, the altitude data and the gradient data acquired at the same time as the image photographing time are superimposed, and they are recorded in an image memory.

On the other hand, Patent Literature 2 discloses an autonomous driving system that automatically selects an autonomous driving function or autonomous driving level according to at least one of the situation around a vehicle and the driving situation of the vehicle from each autonomous driving function or each autonomous driving level of the vehicle, automatically performs a part or all of a vehicle driving operation, and stores a time during autonomous driving and the autonomous driving function or the autonomous driving level selected at the time.

CITATION LIST

Patent Literature

Patent Literature 1: JP 2013-206417 A
Patent Literature 2: International Publication No. 2016-080070 Pamphlet

SUMMARY OF INVENTION

Technical Problem

An image recorded by the technique disclosed in Patent Literature 1 is useful for determining fault liability sharing of an accident vehicle or a driver of the vehicle. On the other hand, in a vehicle capable of autonomous driving, an accident may occur during autonomous driving. In such a case, a driving operation by autonomous driving may cause an accident, which may affect the rate of driver's fault. However, with the technique disclosed in Patent Literature 1, from the recorded image, it is impossible to determine whether the driver's driving operation is the cause of an accident, or the autonomous driving operation is the cause of the accident.

On the other hand, according to the technique disclosed in Patent Literature 2, when an accident, failure, or the like occurs on a vehicle, it is possible to know afterwards what kind of autonomous driving function or autonomous driving level was selected at that time. However, it can be done because a system capable of storing the selected autonomous driving function or autonomous driving level is pre-installed in the vehicle itself. If an information recording device has been added to a vehicle afterwards, it may be difficult for the information recording device to directly acquire the selected autonomous driving function or autonomous driving level from the vehicle.

The present application has been made in view of the above points, and an example of a problem is to provide an information recording device, information recording method, and a program for information recording device, capable of recording an image or the like such that, in the case of checking an outside situation or the like of a moving body afterwards, the situation or the like along with a state or the like of autonomous driving control of the moving body check be checked.

Solution to Problem

An aspect of the present application is an information recording device, comprising: an image information acquisition means that acquires outside image information corresponding to an outside image obtained by photographing the outside of a moving body from the moving body; an autonomous driving information acquisition means that acquires autonomous driving information indicating a state of autonomous driving control of the moving body; a display information acquisition means that acquires display information for simultaneously displaying at least a part of the outside image and an autonomous driving state image indicating the state of the autonomous driving control at a time of photographing the outside image, based on the outside image information and the autonomous driving information; and a recording control means that records the display information in a recording medium.

Another aspect of the present application is an information recording method performed by a computer, the method comprising: an image information acquisition step of acquiring outside image information corresponding to an outside image obtained by photographing the outside of a moving body from the moving body; an autonomous driving information acquisition step of acquiring autonomous driving information indicating a state of autonomous driving control of the moving body; a display information acquisition step of acquiring display information for simultaneously displaying at least a part of the outside image and an autonomous driving state image indicating the state of the autonomous driving control at a time of photographing the outside image, based on the outside image information and the autonomous driving information.

Yet another aspect of the present application is an information recording program that causes a computer to function as the information recording device.

DESCRIPTION OF EMBODIMENTS

Figure 1:
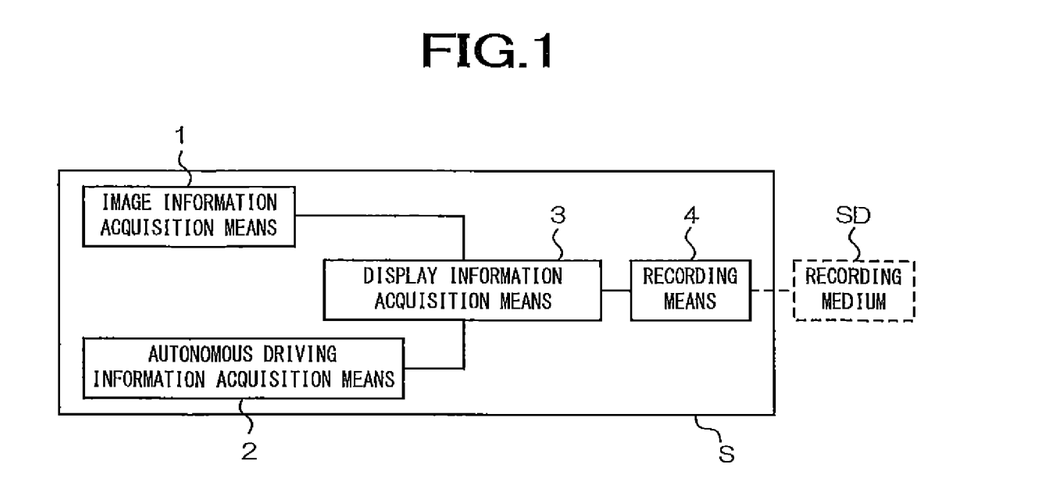
FIG. 1 is a block diagram illustrating an example of a schematic configuration of an information recording device according to an embodiment.

First, the embodiment for carrying out the present application will be described with reference to FIG. 1. FIG. 1 is a block diagram illustrating an example of a schematic configuration of an information recording device according to the embodiment.

As illustrated in FIG. 1, the information recording device S according to the embodiment is configured to include an image information acquisition means 1, an autonomous driving information acquisition means 2, a display information acquisition means 3, and a recording means 4 connected to a recording medium SD.

In this configuration, the image information acquisition means 1 acquires outside image information corresponding to an outside image obtained by photographing the outside of a moving body from the moving body. Examples of the moving body include vehicles, motorcycles, bicycles, aircrafts, ships, and the like.

The autonomous driving information acquisition means 2 acquires autonomous driving information indicating the state of autonomous driving control of the moving body.

The display information acquisition means 3 acquires display information for simultaneously displaying at least a part of the outside image and an autonomous driving state image indicating the state of autonomous driving control of the moving body at a time of photographing the outside image, based on the outside image information acquired by the image information acquisition means 1 and the autonomous driving information acquired by the autonomous driving information acquisition means 2.

The recording means 4 records the display information acquired by the display information acquisition means 3 in a recording medium.

As described above, in the operation of the information recording device S according to the embodiment, based on the outside image information corresponding to the outside image obtained by photographing the outside from the moving body, and the autonomous driving information indicating the state of autonomous driving control, display information for simultaneously displaying at least a part of the outside image and an autonomous driving state image indicating the state of the autonomous driving control of the moving body at the time of photographing the outside image are acquired, and the display information is recorded in the recording medium SD. Therefore, an image or the like can be recorded such that, in the case, for example, where the situation or the like outside the moving body is to be checked afterwards, the situation or the like can be checked along with the state of the autonomous driving control of the moving body.

EXAMPLES

Figure 2:
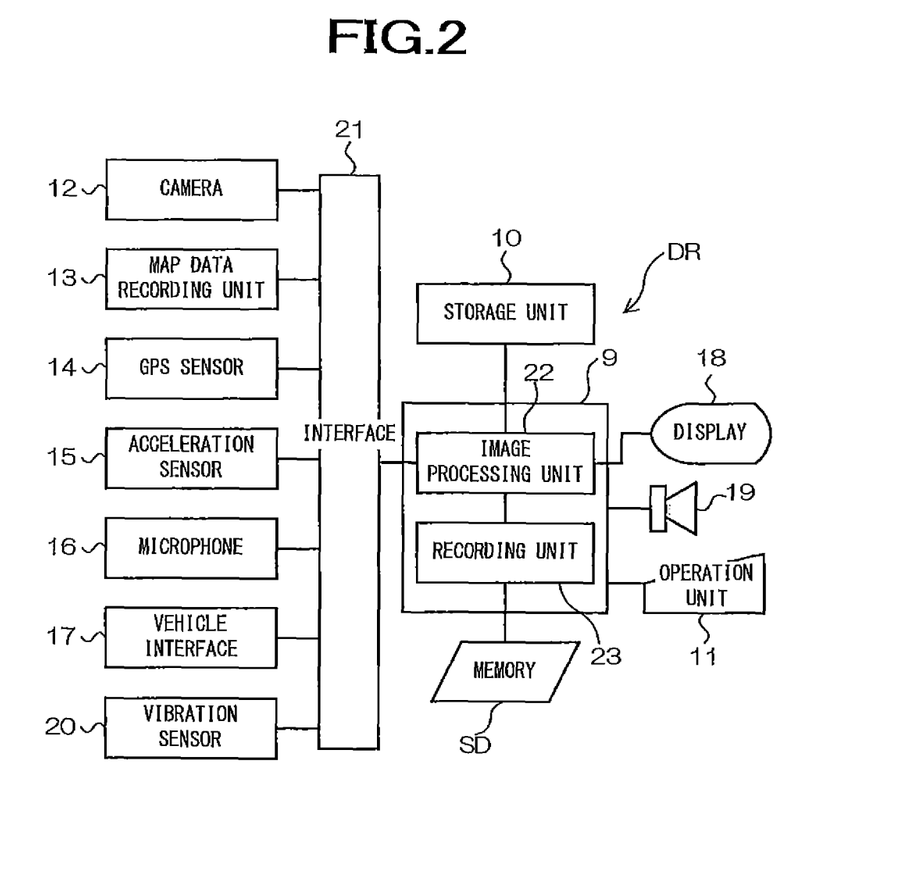
FIG. 2 is a block diagram illustrating an example of a schematic configuration of a driving recorder according to an example.
Figure 3:
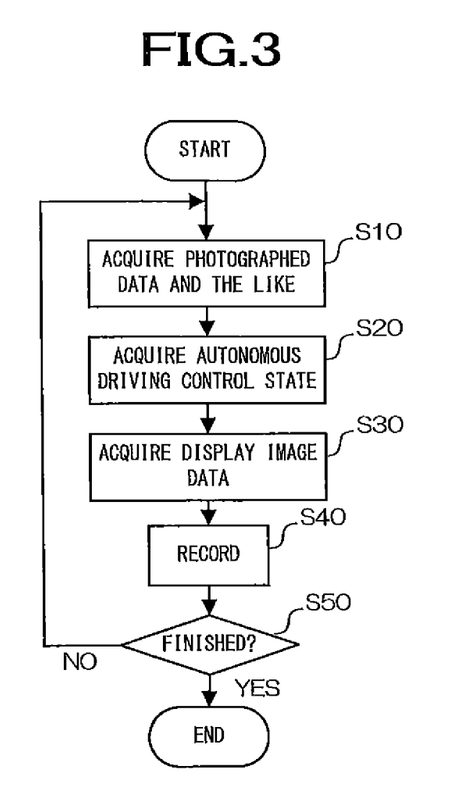
FIG. 3 is a flowchart illustrating an example of a recording process of display image data in the driving recorder according to the example.
Figure 4:
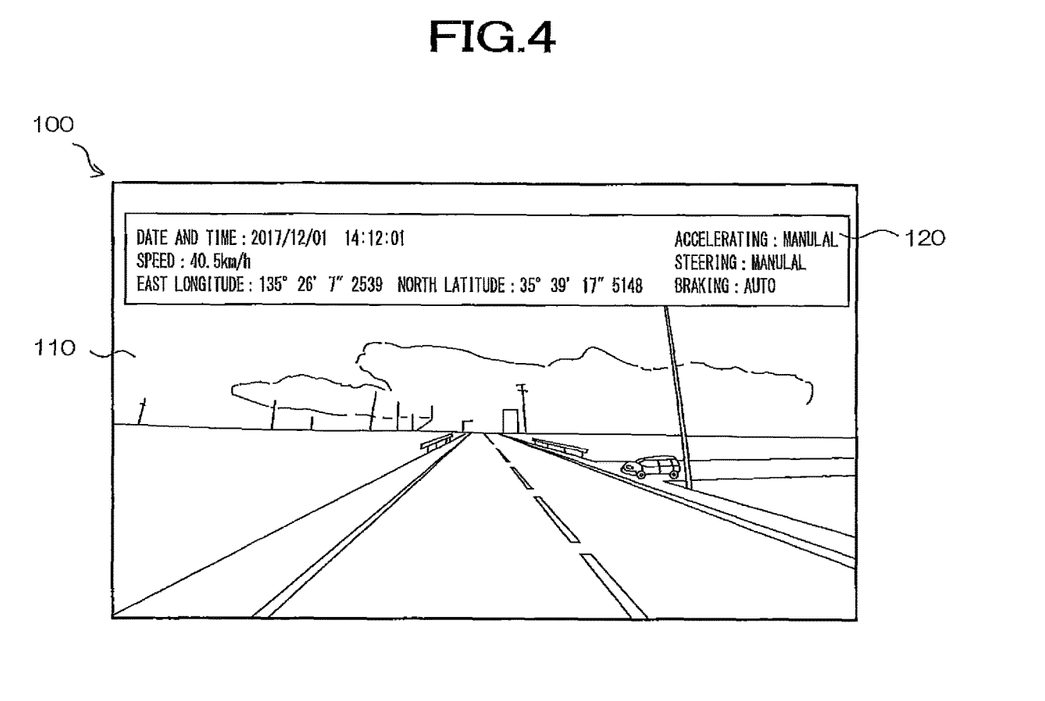
FIG. 4 is a view illustrating an image recorded in a recording process by the driving recorder according to the example.

Next, specific examples corresponding to the above-described embodiment will be described using FIGS. 2 to 4. Examples described below are examples in which the embodiment is applied to a recording process of image data and the like in a driving recorder mounted on a vehicle. FIG. 2 is a block diagram illustrating an example of a schematic configuration of a driving recorder according to the example. FIG. 3 is a flowchart illustrating an example of a recording process of display image data in the driving recorder according to the example. FIG. 4 is a view illustrating an image recorded in a recording process by the driving recorder according to the example.

The driving recorder according to the example is installed inside a vehicle such that a scene in front of the vehicle in which the driving recorder is mounted can be photographed. In the following description, a vehicle in which the driving recorder according to the example is used is simply referred to as "the vehicle". The vehicle is a vehicle that supports autonomous driving. An autonomous driving control system mounted on the vehicle performs an automatic operation of at least one of accelerating, steering, and braking of the vehicle. The vehicle supports multiple autonomous driving levels. The multiple autonomous driving levels are defined as follows, for example.

Level 0: A state in which a driver performs all operations of accelerating, steering, and braking.

Level 1: A state in which the autonomous driving control system performs any one operation of accelerating, steering, and braking.

Level 2: A state in which the autonomous driving control system performs any two operations of accelerating, steering, and braking.

Level 3: A state in which the autonomous driving control system performs all operations of accelerating, steering, and braking, and a driver performs the operations when the autonomous driving control system requests.

Level 4: A state in which all the operations of accelerating, steering, and braking are performed by the autonomous driving control system, and a driver is not involved in driving at all.

The definition of the autonomous driving levels is not limited to the levels 0 to 4 described above. In addition, the number of autonomous driving levels is not limited to five levels.

As illustrated in FIG. 2, the driving recorder DR according to the example includes an operation unit 11 including operation buttons, a touch panel, and the like, a display 18 that outputs various pieces of information, and a speaker 19 that emits necessary operation guidance voice, or the like. In addition to these, the driving recorder DR according to the example includes, a processing unit 9 that includes a CPU, a Read Only Memory (ROM), a Random Access Memory (RAM), and the like, and controls the entire driving recorder DR to exert its functions, a storage unit 10 including a Solid State Drive (SSD) or the like, a camera 12 including, for example, a Complementary Metal-Oxide-Semiconductor (CMOS) image sensor or the like, a map data recording unit 13 including such as an SSD, a Global Positioning System (GPS) sensor 14, an acceleration sensor 15, a microphone 16, a vehicle interface 17, a vibration sensor 20, a memory SD such as, for example, a removable Secure Digital (SD)

card, and an interface 21 that connects the camera 12, the map data recording unit 13, the GPS sensor 14, the acceleration sensor 15, the microphone 16, the vehicle interface 17 and the vibration sensor 20 with the processing unit 9. Further, the processing unit 9 includes an image processing unit 22 and a recording unit 23. The image processing unit 22 and the recording unit 23 may be realized by a hardware logic circuit including the CPU or the like that forms the processing unit 9, or may be realized by software by reading and executing a program corresponding to a recording process of display image data according to an example described later by the CPU.

At this time, the interface 21 corresponds to an example of the image information acquisition means 1 and an example of the autonomous driving information acquisition means 2 according to the embodiment, and the image processing unit 22 corresponds to an example of the display information acquisition means 3 according to the embodiment. Further, the recording unit 23 corresponds to an example of the recording means 4 of the information recording device S according to the embodiment, and the memory SD corresponds to an example of the recording medium SD according to the embodiment. Then, the interface 21, the image processing unit 22, and the recording unit 23 constitute an example of the information recording device S according to the embodiment.

In the configuration described above, the operation unit 11 is formed by operation buttons, a touch panel, or the like in a part of the driving recorder DR, and the operation unit 11 receives an operation by a user and outputs an operation signal corresponding to the operation to the processing unit 9. Under the control by the processing unit 9, the display 18 displays information to be presented to the user as functions of the driving recorder DR by using, for example, images, icons, or the like. Under the control by the processing unit 9, the speaker 19 emits an operation guidance voice and the like necessary for exerting the functions of the driving recorder DR.

Next, the camera 12 photographs the outside of the vehicle. For example, in the camera 12, a surrounding including the front in the moving direction of the vehicle is within its photographing range. Then, the camera 12 generates photographed data corresponding to an outside image obtained by photographing within the photographing range, and outputs the photographed data to the image processing unit 22 of the processing unit 9 via the interface 21. While the outside image is a moving image in the example, the outside image may be a still image. On the other hand, the map data recording unit 13 records general road data and intersection data as map data. The map data recording unit 13 outputs map data such as road data to the image processing unit 22 via the interface 21 in response to a request from the image processing unit 22.

On the other hand, the GPS sensor 14 outputs position data indicating the current position of the driving recorder DR to the image processing unit 22 via the interface 21 based on a result of receiving a navigation radio wave from a navigation satellite (not illustrated). Here, in other words, the current position of the driving recorder DR is also the current position of the vehicle. Next, the acceleration sensor 15 detects acceleration added to the vehicle with respect to, for example, each of the traveling direction, the lateral direction, and the vertical direction of the vehicle, and outputs acceleration data as a detection result to the image processing unit 22 via the interface 21. The image processing unit 22 may generate a map image of the vicinity of the vehicle and a navigation image for guiding the vehicle to the destination based on the current position of the vehicle, road data, etc., and output the navigation image to the display 18.

On the other hand, the microphone 16 collects, for example, a sound or a voice inside the vehicle of the vehicle, and outputs audio data as a result of the collection to the image processing unit 22 via the interface 21. At this time, the microphone 16 may be capable of collecting sound or voice outside the vehicle. The vibration sensor 20 detects vibration of a seat such as a driver's seat of the vehicle. Then, the vehicle interface 17 acquires the autonomous driving data indicating the state of the autonomous driving control via an in-vehicle network such as a Controller Area Network (CAN), and outputs the autonomous driving data to the image processing unit 22 via the interface 21. The state of autonomous driving control means, for example, which control object among accelerating, steering and braking is under autonomous driving control, or at which autonomous driving level the autonomous driving control is performed.

The image processing unit 22 acquires display image data for simultaneously displaying at least a part of the outside image and the autonomous driving control state image indicating the state of the autonomous driving control at the time when the outside image is photographed, based on the photographed data, the autonomous driving data, and the like acquired via the interface 21. The recording unit 23 records the display image data acquired by the image processing unit 22 in the memory SD. In this case, the recording unit 23 records the display image data in the memory SD in a general-purpose format. The general-purpose format is, for example, Moving Picture 4 (MP4) format, Audio video Interleave (AVI) format, MOV format, or the like. Further, the image processing unit 22 and the recording unit 23 record audio data in the memory SD in synchronization with the corresponding display image data in parallel with recording of the display image data in the memory SD. Then, display image data, audio data, and the like recorded in the memory SD is displayed or played back by an external player (not illustrated) or the like, for example, at the time of subsequent inspection of such as an accident.

Next, in the driving recorder DR having the above-described configuration according to the example, the recording processing of the display image data according to the example, which is executed mainly by the image processing unit 22, will be described with reference to FIG. 3.

The recording processing of the display image data is started at the timing when the power of the driving recorder DR is turned on, for example.

The image processing unit 22 first acquires photographed data via the interface 21. At this time, the interface 21 functions as the image information acquisition means 1 of the information recording device S. That is, the interface 21 acquires the photographed data of the outside image photographed by the camera 12 and outputs the photographed data to the image processing unit 22 (step S10).

Next, the image processing unit 22 acquires the autonomous driving data and the like via the interface 21. The autonomous driving data may be data indicating either automatic or manual each operation of accelerating, steering, and braking is, or may be data indicating the autonomous driving level. At this time, the interface 21 functions as the autonomous driving information acquisition means 2 of the information recording device S. That is, the interface 21 acquires the autonomous driving data, the current date and time, the traveling speed, and the current position information of the vehicle via the vehicle interface 17 and outputs the information to the image processing unit 22 (step S20).

Next, the image processing unit 22 performs a process of generating display image data to be recorded in the memory SD and the like, based on the information obtained in steps S10 and S20. For example, the image processing unit 22 generates an autonomous driving control state image indicating the current state of autonomous driving control based on the autonomous driving data and the like. That is, the image processing unit 22 functions as the display information acquisition means 3 of the information recording device S. In addition to the state of autonomous driving control, the image processing unit 22 may generate the autonomous driving control image so as to display at least any one of information indicating the situation in which the vehicle is placed, such as the current date and time, the traveling speed, and the current position of the vehicle. The image processing unit 22 may, for example, embedding in the outside image an autonomous driving control state image indicating the state of the autonomous driving control at the time of photographing the outside image by image composition to generate the display image data. Alternatively, the image processing unit 22 may generate display image data including the outside image and the autonomous driving control state image indicating the state of autonomous driving control at the time of photographing the outside image as separate layers. The image processing unit 22 temporarily stores the generated display image data in the RAM or the like of the processing unit 9 (step S30).

Then, when the acceleration sensor 15 detects an acceleration larger than a predetermined value, the recording unit 23 records the display image data acquired in a predetermined time before and after the timing when such acceleration is detected and temporarily stored in the RAM or the like on the recording medium SD as record information. That is, the recording unit 23 functions as the recording means 4 of the information recording device S. When the acceleration larger than the predetermined value is detected, it is probable that the vehicle is suddenly braked, or the vehicle is impacted. If the acceleration larger than the predetermined value is not detected, the recording on the recording medium SD is not performed (step S40). The recording unit 23 may record the display image data in the memory SD when the autonomous driving level changes in addition to when the acceleration larger than the predetermined value is detected.

After that, the image processing unit 22 determines whether or not the recording process of the display image data according to the example is to be ended because the power of the driving recorder DR is turned off, or the like (step S50). When the recording process ends at the determination of step S50 (step S50: YES), the image processing unit 22 ends the process instantly. On the other hand, at the determination of step S50, if the recording process is to be continued (step S50: NO), the image processing unit 22 returns to step S10 and repeats each process described above.

Next, an image to be displayed using the display image data recorded in the memory SD as a result of the recording process of the display image data according to the example described with reference to FIG. 3 will be described with reference to FIG. 4. As illustrated in FIG. 4, an image 100 to be displayed by the player described above using the display image data includes an outside image 110 and an autonomous driving control state image 120. For example, the image 100 is generated by embedding the autonomous driving control state image 120 in the outside image 110. In FIG. 4, the autonomous driving control state image 120 indicates either automatic or manual each operation of accelerating, steering, and braking is. However, the autonomous driving control state image 120 may indicate the autonomous driving level. Alternatively, the autonomous driving control state image 120 may indicate a control object whose operation is automatic among accelerating, steering, and braking. The autonomous driving control state image 120 may indicate at least one of the current date and time, the traveling speed, the latitude and longitude of the current position, and the like, in addition to indicating the state of autonomous driving control. Further, when the image 100 is displayed using the display image data including the outside image and the autonomous driving control state image as separate layers, display and non-display of the autonomous driving control state image 120 can be switched based on the user's operation on the player. When the autonomous driving control state image 120 is not displayed, the entire outside image 110 is displayed. As a result, it is possible to see a part of the outside image 110 hidden by the autonomous driving control state image 120. Alternatively, the outside image 110 and the autonomous driving control state image 120 may be displayed separately. For example, an area for displaying the outside image 110 and an area for displaying the autonomous driving control state image 120 are each set on a screen of the player, and when the user performs a predetermined display operation while the outside image 110 is displayed, the autonomous driving state image 120 indicating the state of the autonomous driving control at the time of photographing the outside image 110 is displayed in an area different from the area of the outside image 110.

As described above, according to the operation according to the example, based on an outside image of the outside of the vehicle photographed from the vehicle and the state of autonomous driving control of the vehicle, the display image data for displaying at least a part of the outside image and the autonomous driving state image indicating the state of the autonomous driving control at the time of photographing the outside image simultaneously is recorded in the memory SD, and therefore an image or the like can be recorded such that, in the case of, for example, checking the situation or the like outside the vehicle afterwards, the situation or the like together with the state of the autonomous driving control of the vehicle can be checked.

In addition, when acquiring the display image data corresponding to the image generated by embedding the autonomous driving state image in the outside image, display image data can be recorded in the memory SD for displaying for easily checking the state of the autonomous driving control and the outside situation in association with each other.

Further, when the autonomous driving state image indicates at least an object under the autonomous driving control among accelerating, steering, and braking of the vehicle, it is possible to easily check which operations among accelerating, steering, and braking is automatic.

Further, when the autonomous driving state image indicates the autonomous driving level, it is possible to easily check at which autonomous driving level the autonomous driving control is performed.

Further, when the display image data is recorded in the memory SD using a general-purpose format, the versatility in playing back or displaying the display image data can be improved.

The recording medium in which the display data is recorded is not limited to the memory SD that is provided in the driving recorder DR or that the driving recorder DR can directly access. For example, the recording medium may be a storage unit such as a hard disk provided in a server device (not illustrated) outside the vehicle. For example, the driving recorder DR has a communication unit for performing wireless communication with the server device. The driving recorder DR may store display image data in the storage unit of the server device by transmitting the display image data to the server device through the communication unit in response to detection of sudden braking or impact of the vehicle or the like. In this case, the communication unit of the driving recorder DR corresponds to the recording means 4 of the information recording device S. In such a form, for example, by transmitting the display image data to the server device of an automobile insurance company, the automobile insurance company can more quickly determine the negligence rate when an accident occurs.

[Modifications]

In the above example, the autonomous driving data indicating the state of the autonomous driving control of the vehicle is acquired via the vehicle interface 17. However, the information indicating the state of the autonomous driving control may be acquired by the methods described below. According to the modifications described below, even if information indicating the state of autonomous driving control of the vehicle cannot be directly obtained from the vehicle via the vehicle interface 17 because, for example, the driving recorder DR has been retrofitted to the vehicle, it is possible to acquire information indicating the state of autonomous driving control.

[First Modification]

The interface 21 may acquire the information indicating the state of the autonomous driving control based on the relationship between the driving operation performed by the driver of the vehicle and the behavior of the vehicle at the time of the driving operation.

For example, the camera 12 includes an outside camera that photographs an image of the outside of the vehicle, and one or a plurality of in-vehicle cameras that photographs an image of the interior of the vehicle. The in-vehicle camera is installed in the interior such that steering wheel and its surroundings, and an accelerator pedal and a brake pedal and their surroundings are in the photographing range. The image processing unit 22 analyzes the image photographed by the in-vehicle camera and recognizes the driver's limbs from the image using pattern recognition. Then, the image processing unit 22 identifies the driving operation by the driver based on the recognized movement of the limbs.

(1) Accelerating

The image processing unit 22 compares, for example, operation of depressing the accelerator pedal by the driver and change in longitudinal acceleration of the vehicle detected by the acceleration sensor 15, and determines whether or not there is a relationship between the operation of depressing the accelerator pedal and the change in longitudinal acceleration of the vehicle. For example, when a positive acceleration occurs in the traveling direction of the vehicle when an accelerator is depressed, it is determined that the two are related. On the other hand, if no positive acceleration occurs in the traveling direction of the vehicle when an accelerator is depressed, it is determined that the two are not related. Alternatively, when a positive acceleration occurs in the traveling direction of the vehicle even though an accelerator has not been depressed, it is determined that the two are not related. The image processing unit 22 determines that the control of acceleration is manually performed when the relationship is acknowledged, and determines that the control of acceleration is automatically performed when the relationship is not acknowledged.

The image processing unit 22 may calculate the acceleration of the vehicle from the change in the moving speed in the outside image of the outside feature (for example, buildings, utility poles, road surface painting, traffic signs, plants, etc.) photographed by the outside camera. Alternatively, the image processing unit 22 may compare the change in the speed of the vehicle with the operation of depressing an accelerator pedal instead of the acceleration.

(2) Steering

The image processing unit 22 determines whether or not a relationship is acknowledged between the steering operation and the change in the traveling direction of the vehicle by comparing the steering operation by the driver with the change in the traveling direction of the vehicle, for example. For example, if the traveling direction of the vehicle changes to the right direction when the steering wheel is rotated right by the driver, it is determined that the two are related. Further, if the traveling direction of the vehicle changes to the left direction when the steering wheel is rotated left by the driver, it is determined that the two are related. On the other hand, if the traveling direction of the vehicle changes even though the driver is not operating the steering wheel, it is determined that the two are not related. The image processing unit 22 determines that the steering control is manually performed when the relationship is acknowledged, and determines that the steering control is automatically performed when the relationship is not acknowledged.

The image processing unit 22 may identify the change in the traveling direction of the vehicle based on, for example, the lateral acceleration of the vehicle detected by the acceleration sensor 15. For example, the image processing unit 22 determines that the traveling direction of the vehicle changes to the right direction when acceleration in the right direction occurs and that the traveling direction of the vehicle changes to the left direction when acceleration in the left direction occurs. Alternatively, the image processing unit 22 may identify the change in the traveling direction of the vehicle based on the moving direction of the outside feature photographed by the outside camera in the outside image. Alternatively, the driving recorder DR may be provided with an angular velocity sensor for detecting the changing speed in the traveling direction of the vehicle. The change in the traveling direction of the vehicle may be identified based on the angular velocity detected by an angular velocity sensor.

(3) Braking

The image processing unit 22 compares, for example, the operation of depressing the brake pedal by the driver and changes in the longitudinal acceleration of the vehicle detected by the acceleration sensor 15, and determines whether or not there is a relationship between the operation of depressing the brake pedal and the change in the longitudinal acceleration of the vehicle. For example, when a negative acceleration occurs in the traveling direction of the vehicle when a brake is depressed, it is determined that the two are related. On the other hand, if no negative acceleration occurs in the traveling direction of the vehicle when the accelerator is depressed, it is determined that the two are not related. Alternatively, if a negative acceleration occurs in the traveling direction of the vehicle even though a brake has not been depressed, it is determined that the two are not related. The image processing unit 22 determines that the braking control is manually performed when the relationship is acknowledged, and determines that the braking control is automatically performed when the relationship is not acknowledged.

The image processing unit 22 may calculate the acceleration of the vehicle from the change in the moving speed in the outside image of the outside feature photographed by the outside camera. Alternatively, the image processing unit 22 may compare the change in the speed of the vehicle with the operation of depressing the brake pedal instead of acceleration.

In the present example, the driving operation by the driver is identified by analyzing an image photographed by the in-vehicle camera. However, instead of the in-vehicle camera, sensors may be installed on the steering wheel and the operation pedals. Then, the image processing unit 22 may identify the driving operation by the driver based on the output from the sensors. For example, an angular velocity sensor and a contact sensor are installed on the steering wheel. When the contact sensor detects that the driver is in contact with the steering wheel, and the angular velocity sensor detects that the steering wheel has an angular velocity, the image processing unit 22 determines that the driver is operating the steering wheel. At this time, the image processing unit 22 determines the steering rotation direction based on whether the angular velocity is positive or negative. Further, a load sensor is installed on the operation pedal. The image processing unit 22 determines that the driver depresses the operation pedal when the load detected by the load sensor increases.

[Second Modification]

At least one of the in-vehicle camera of the camera 12, the microphone 16, and the vibration sensor 20 may detect in the vehicle a notification of the state of autonomous driving control of the vehicle, and the notification is perceivable by a person in the vehicle. Inside the vehicle, the state of autonomous driving control is notified by the autonomous driving control system. This notification is perceivable (recognizable by stimulation of the sensory organs) to a driver and other person who is inside the vehicle. Examples of the notification method include display on an instrument panel provided inside the vehicle, output of a notification sound from a speaker provided in the vehicle, and vibration of a steering wheel or a seat such as a driver's seat.

The image processing unit 22 may determine the state of autonomous driving control based on the notification detected by the in-vehicle camera of the camera 12, the microphone 16, or the vibration sensor 20.

Here, the storage unit 10 may store, for each state of the autonomous driving control, a notification mode corresponding to a vehicle type of the vehicle as an example of a type of the moving body. Then, the image processing unit 22 may determine the state of autonomous driving control based on the comparison between a mode of the detected notification and the notification mode stored in the storage unit 10.

(1) Instrument Panel Display

The instrument panel is provided with a display for displaying a state of autonomous driving control, for example. On this display, the autonomous driving level may be displayed. Alternatively, information indicating whether each of accelerating, steering, and braking operations is automatic or manual may be displayed. Alternatively, a control object whose operation is automatically performed, among accelerating, steering, and braking, may be displayed.

The in-vehicle camera is installed in the vehicle such that the display is in the photographing range. The in-vehicle camera detects the display of the state of the autonomous driving control on the instrument panel as the notification. The image processing unit 22 acquires the information indicating the state of the autonomous driving control based on the photographing result by the in-vehicle camera. Specifically, the image processing unit 22 analyzes the image photographed by the in-vehicle camera to acquire information indicating the state of the autonomous driving control of the vehicle displayed on the display. Specifically, the image processing unit 22 recognizes the state of the autonomous driving control of the vehicle displayed on the display from the image. For example, the storage unit 10 may previously store the feature amount of an image indicating the display on the instrument panel corresponding to the vehicle type of the vehicle or the like for each state of autonomous driving control as the notification mode. The image processing unit 22 may determine which of the autonomous driving control states the photographed image corresponds to, for example, by comparing the feature amount extracted from the photographed image on the instrument panel display and the feature amounts stored in the storage unit 10.

The display of the autonomous driving control state on the instrument panel is always performed, but this display may be discontinuously performed. For example, at least when the vehicle starts driving and when the state of autonomous driving control changes, the autonomous driving control state is displayed. It is necessary to determine the state of autonomous driving control while the autonomous driving control state is not displayed. For example, when the display of autonomous driving control state is not detected by the in-vehicle camera, the image processing unit 22 may determine that the state of the autonomous driving control previously determined by the image processing unit 22 is continuing.

(2) Notification Sound

The autonomous driving control system of the vehicle discontinuously outputs a notification sound indicating the autonomous driving control state by a speaker provided in an instrument panel or the like of the vehicle. For example, a notification sound is output at least when the driving of the vehicle starts and when the state of autonomous driving control changes. The notification sound may be a voice indicating the autonomous driving level such as "autonomous driving level 2" or may be, for example, a buzzer sound or the like corresponding to the autonomous driving level such as "beep".

The microphone 16 collects in-vehicle sound of the vehicle to detect a notification sound indicating the state of autonomous driving control as the notification. The image processing unit 22 acquires information indicating the state of the autonomous driving control, based on the collection result of the notification sound by the microphone 16. Specifically, the image processing unit 22 determines the state of autonomous driving control based on the in-vehicle sound collected by the microphone 16. For example, the storage unit 10 may previously store, as the notification mode, the feature amount or the like of the notification sound corresponding to the vehicle type of the vehicle for each state of autonomous driving control. The image processing unit 22 may determine which of the autonomous driving control states the collected notification sound corresponds to, for example, by comparing the feature amount extracted from the collected notification sound and the feature amounts stored in the storage unit 10.

Since the notification sound is discontinuously output, it is necessary to determine the state of the autonomous driving control even while the notification sound is not output. For example, when the notification sound is not detected by the microphone 16, the image processing unit 22 may determine that the state of the autonomous driving control previously determined by the image processing unit 22 is continuing.

(3) Steering Wheel or Seat Vibration

A vibrator is provided to a steering wheel or a seat such as a driver's seat. The autonomous driving control system for the vehicle discontinuously causes the vibration of the steering wheel or the seat that indicates the state of the autonomous driving control by driving the vibrator. For example, the steering wheel or the seat vibrates at least when the driving of the vehicle starts and when the state of autonomous driving control changes. The steering wheel or seat vibrates in a manner corresponding to the autonomous driving control state. For example, the length of time the vibration continues, the strength of the vibration, the pattern of the vibration, etc. correspond to the autonomous driving control state.

The vibration sensor 20 detects a vibration indicating the state of autonomous driving control of the steering wheel or the seat as the notification. The image processing unit 22 acquires information indicating the state of the autonomous driving control, based on the detection result of vibration by the vibration sensor 20. Specifically, the image processing unit 22 determines the state of autonomous driving control based on the vibration detected by the vibration sensor 20. For example, the storage unit 10 may previously store, as the notification mode, information indicating a mode of steering wheel or seat vibration corresponding to the vehicle type of the vehicle for each state of autonomous driving control. The image processing unit 22 may determine which autonomous driving control state detected vibration corresponds to, for example, by comparing the mode of the detected vibration and the vibration modes indicated by the information stored in the storage unit 10.

Since the notification by vibration is performed discontinuously, it is necessary to determine the state of the autonomous driving control even while the steering wheel or seat is not vibrating. For example, when the vibration sensor 20 does not detect vibration, the image processing unit 22 may determine that the state of the autonomous driving control previously determined by the image processing unit 22 is continuing.

Next, the acquisition process of the information indicating the state of the autonomous driving control of the vehicle will be described with reference to FIG. 5, and the process is executed mainly by the image processing unit 22 in the driving recorder DR according to the present modification. The acquisition process of the information indicating the state of the autonomous driving control is executed in step S20 of the recording process illustrated in FIG. 3.

Figure 5:
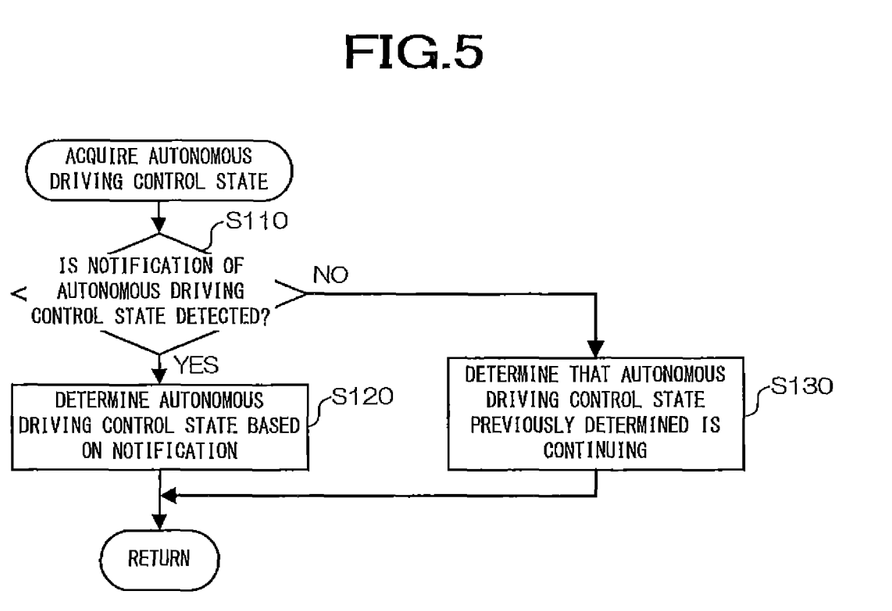
FIG. 5 is a flowchart illustrating an example of an acquisition process of a state of autonomous driving control in a driving recorder according to a modification.

As illustrated in FIG. 5, the image processing unit 22 determines whether the state of autonomous driving control is detected (step S110). For example, when it is determined that the state of autonomous driving control is displayed on the instrument panel based on the comparison between the feature amount of the image of the instrument panel photographed by the in-vehicle camera and the feature amount of the image of the state of autonomous driving control displayed by the instrument panel, which is stored in the storage unit 10, the image processing unit 22 determines that the state of autonomous driving control has been detected. Alternatively, when it is determined that the collected in-vehicle sound is a notification sound based on the comparison between the feature amount of the in-vehicle sound collected by the microphone 16 and the feature amount of the notification sound stored in the storage unit 10, the image processing unit 22 determines that the state of autonomous driving control has been detected. Alternatively, when the vibration sensor 20 detects vibration of the steering wheel or seat, the image processing unit 22 determines that the state of autonomous driving control is detected. When the state of autonomous driving control is detected, the image processing unit 22 advances the processing to step S120. If the autonomous driving control state is constantly displayed on the instrument panel, the image processing unit 22 may execute step S120 without performing the determination of step S110. On the other hand, when the state of the autonomous driving control is not detected, the image processing unit 22 advances the processing to step S130.

In step S120, the image processing unit 22 determines the state of autonomous driving control based on the detected notification. For example, in the case of the display by the instrument panel, the image processing unit 22 determines the state of autonomous driving control based on the comparison between the image feature amounts executed in step S110. In the case of the notification sound, the image processing unit 22 determines the state of autonomous driving control based on the comparison between the sound feature amounts executed in step S110. In the case of vibration, the image processing unit 22 determines the state of autonomous driving control based on the comparison between the mode of the vibration detected by the vibration sensor and the information indicating the vibration mode stored in the storage unit 10. The image processing unit 22 acquires information indicating the determined state of the autonomous driving control as information for generating display image data to be recorded in the memory SD. Further, the image processing unit 22 temporarily stores the information indicating the determined state of the autonomous driving control in a RAM or the like.

In step S130, the image processing unit 22 determines that the previously determined state of the autonomous driving control is continuing. Then, the image processing unit 22 acquires the information indicating the state of the autonomous driving control temporarily stored in the RAM as the information for generating display image data.

When step S120 or S130 is executed, the image processing unit 22 ends the process of acquiring the information indicating the state of the autonomous driving control, and advances the process to step S30 illustrated in FIG. 3. In steps S30 and S40 illustrated in FIG. 3, by generating and recording the display image data, the state of the autonomous driving control determined by the image processing unit 22, the current date and time, the position of the vehicle, and the outside image data are recorded as the record information. Note that, in the present modification, the interface 21 may acquire at least one of the current date and time, the position of the vehicle, and the outside image data as situation information. Then, the interface 21 may acquire the state of the autonomous driving control determined by the image processing unit 22 when the situation information is acquired, and the recording unit 23 may record the record information including the acquired situation information and the acquired state of the autonomous driving control in the memory SD.

As described above, according to the operation of the second modification, a notification of the state of autonomous driving control of the vehicle, which is perceivable by a person in the vehicle, is detected in the vehicle, and the state of autonomous driving control is determined based on the detected notification. Therefore, the state of autonomous driving control can be determined without directly acquiring information indicating the autonomous driving state from the vehicle.

Further, when the display of the state of autonomous driving control on the instrument panel is detected as the notification, the state of the autonomous driving control can be determined based on the display on the instrument panel.

Further, when the notification sound indicating the state of the autonomous driving control is detected as the notification, the state of the autonomous driving control can be determined based on the notification sound.

Further, when vibration of the operation handle or the seat of the vehicle that indicates the state of the autonomous driving control is detected as the notification, the state of autonomous driving control can be determined based on the vibration.

Further, when the above-described notification performed discontinuously is detected, and the notification of the state of the autonomous driving control is not detected, if it is determined that the state of autonomous driving control that was determined last time is continuing, even when the notification is performed discontinuously, the state of the autonomous driving control can be appropriately determined.

Further, when the state of the autonomous driving control is determined based on the comparison between the mode of the detected notification and the mode of notification stored in the storage unit 10, the state of autonomous driving control can be easily determined.

In addition, in the case of acquiring the situation information that is at least one of the current date and time, the position of the vehicle, and an outside image, acquiring the state of the autonomous driving control when the situation information is acquired, which is the determined state of the autonomous driving control, and recording the record information including the situation information and the state of autonomous driving control in the memory SD, the situation in which the vehicle is placed can be checked afterwards together with the state of the autonomous driving control of the vehicle.

REFERENCE SIGNS LIST 1 image information acquisition means
2 autonomous driving information acquisition means
3 display information acquisition means
4 recording means
9 processing unit
10 storage unit
12 camera
14 GPS
15 acceleration sensor
16 microphone
17 vehicle interface
20 vibration sensor
21 interface
22 image processing unit
23 recording unit
SD recording medium, memory
S information recording device
DR driving recorder

The invention claimed is:
1. An information recording device, comprising:
at least one memory configured to store computer program code;
at least one processor configured to access the at least one memory and operate according to the computer program code, the computer program code comprising:
an image information acquisition code configured to cause at least one of the at least one processor to acquire outside image information corresponding to an outside image obtained by photographing the outside of a moving body from the moving body;
an autonomous driving information acquisition code configured to cause at least one of the at least one processor to acquire autonomous driving information indicating a state of autonomous driving control of the moving body;
a display information acquisition code configured to cause at least one of the at least one processor to acquire display information for simultaneously displaying at least a part of the outside image and an autonomous driving state image indicating the state of the autonomous driving control at a time of photographing the outside image, based on the outside image information and the autonomous driving information; and
a recording control code configured to cause at least one of the at least one processor to record the display information in a recording medium,
wherein the autonomous driving state image includes acceleration information indicating whether accelerating of the moving body is under the autonomous driving control.

2. The information recording device according to claim 1, wherein the display information acquisition code is configured to cause at least one of the at least one processor to acquire the display information corresponding to an image generated by embedding the autonomous driving state image in the outside image.

3. The information recording device according to claim 1, wherein the autonomous driving state image indicates at least one, of accelerating, steering, and braking of the moving body, under the autonomous driving control.

4. The information recording device according to claim 1, wherein the autonomous driving state image indicates a level of the autonomous driving.

5. The information recording device according to claim 1, wherein the autonomous driving information acquisition code is configured to cause at least one of the at least one processor to acquire the autonomous driving information based on a relationship between a driving operation performed by a driver of the moving body and a behavior of the moving body at the time of the driving operation.

6. The information recording device according to claim 1, wherein the autonomous driving information acquisition code is configured to cause at least one of the at least one processor to acquire the autonomous driving information, based on a result of photographing a display of the state of the autonomous driving control on an instrument panel of the moving body.

7. The information recording device according to claim 1, wherein the autonomous driving information acquisition code is configured to cause at least one of the at least one processor to acquire the autonomous driving information, based on a result of collecting a sound, output in the moving body, indicating the state of the autonomous driving control.

8. The information recording device according to claim 1, wherein the autonomous driving information acquisition code is configured to cause at least one of the at least one processor to acquire the autonomous driving information, based on a result of detecting a vibration, of a steering wheel or a seat of the moving body, indicating the state of the autonomous driving control.

9. The information recording device according to claim 1, wherein the outside image is a moving image.

10. The information recording device according to claim 1, wherein the autonomous driving state image indicates which of accelerating, steering, and braking of the moving body is under the autonomous driving control.

11. The information recording device according to claim 1, wherein the autonomous driving state image includes, separately, the acceleration information and steering information indicating whether steering of the moving body is under the autonomous driving control.

12. The information recording device according to claim 1, wherein the autonomous driving state image includes, separately, the acceleration information and brake information indicating whether breaking of the moving body is under the autonomous driving control.

13. The information recording device according to claim 1, wherein the autonomous driving state image includes, separately, the acceleration information, steering information indicating whether steering of the moving body is under the autonomous driving control, and brake information indicating whether breaking of the moving body is under the autonomous driving control.

14. An information recording method performed by a computer, the method comprising:
   an image information acquisition step of acquiring outside image information corresponding to an outside image obtained by photographing the outside of a moving body from the moving body;
   an autonomous driving information acquisition step of acquiring autonomous driving information indicating a state of autonomous driving control of the moving body;
   a display information acquisition step of acquiring display information for simultaneously displaying at least a part of the outside image and an autonomous driving state image indicating the state of the autonomous driving control at a time of photographing the outside image, based on the outside image information and the autonomous driving information; and
   a recording control step of recording the display information in a recording medium, wherein the autonomous driving state image includes acceleration information indicating whether accelerating of the moving body is under the autonomous driving control.

15. A non-transitory computer readable medium storing thereon a computer program, the program causing a computer to:
   acquire outside image information corresponding to an outside image obtained by photographing the outside of a moving body from the moving body;
   acquire autonomous driving information indicating a state of autonomous driving control of the moving body;
   acquire display information for simultaneously displaying at least a part of the outside image and an autonomous driving state image indicating the state of the autonomous driving control at a time of photographing the outside image, based on the outside image information and the autonomous driving information; and
   record the display information in a recording medium,
   wherein the autonomous driving state image includes acceleration information indicating whether accelerating of the moving body is under the autonomous driving control.

* * * * *